C. HODGE.
STORAGE BATTERY.
APPLICATION FILED MAY 25, 1915.

1,207,293.

Patented Dec. 5, 1916.

WITNESS:
Rob. R. Kitchel.

INVENTOR
Carroll Hodge
BY
Augustus B. Stoughton
ATTORNEY.

UNITED STATES PATENT OFFICE.

CARROLL HODGE, OF RADNOR, PENNSYLVANIA.

STORAGE BATTERY.

1,207,293.  Specification of Letters Patent.  Patented Dec. 5, 1916.

Application filed May 25, 1915. Serial No. 30,300.

*To all whom it may concern:*

Be it known that I, CARROLL HODGE, a citizen of the United States, residing at Radnor, in the county of Delaware and State of Pennsylvania, have invented certain new and useful Improvements in Storage Batteries, of which the following is a specification.

Storage batteries are usually mounted in so-called hard rubber jars placed in wooden boxes, and it not infrequently happens that when the batteries are new the jars break causing inconvenience out of all proportion to the relative value of the jar.

It is the principal object of the present invention to prevent such breakage and its consequent inconvenience.

The contiguous faces of the jars and boxes are not perfectly true and flat and hence are not in contact throughout their extent. In consequence of this the box wall imperfectly supports the jar wall and the latter, being brittle and lacking proper support, breaks under the weight of the contents of the jar. By my invention I secure initially perfect contact and therefore efficient support between the contiguous faces of the jar and box walls so that the latter contact with and efficiently support the former and hence the jars do not crack but remain in service even though they are brittle. In describing how I accomplish this result reference will be made to the accompanying drawings in which—

Figure 3:
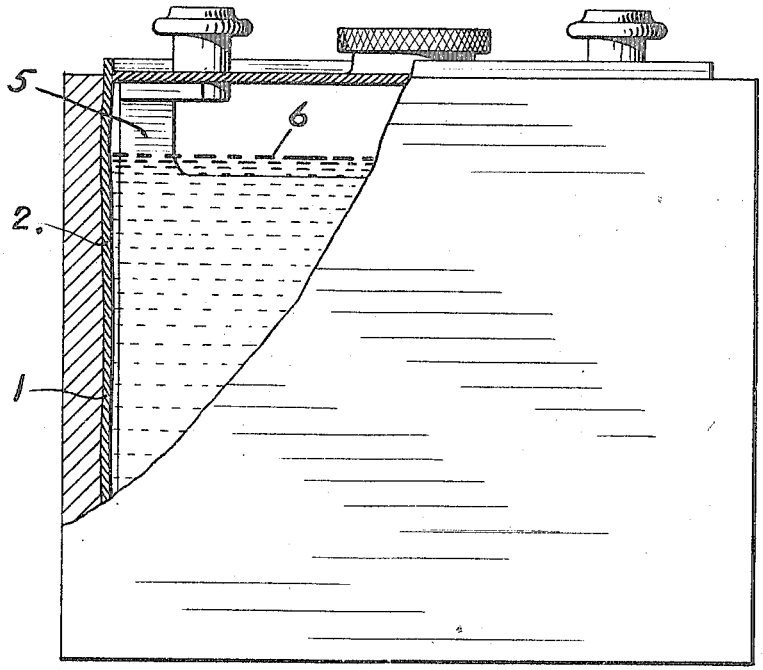
Figure 1:
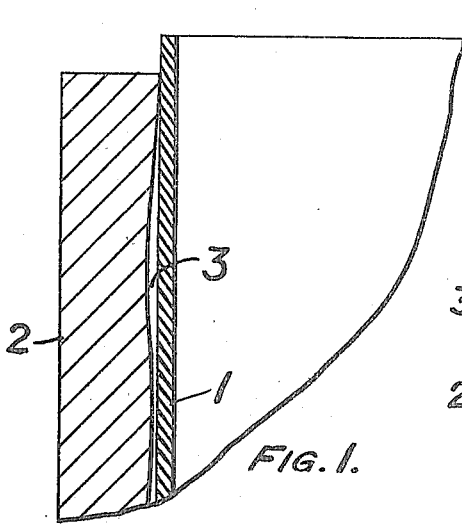
Figure 2:
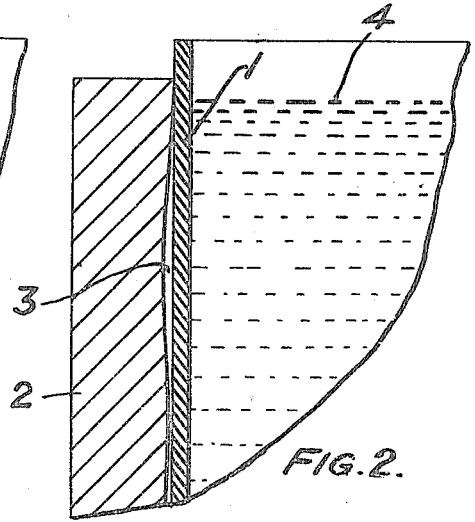

Figure 1, is a sectional view of a part of a jar and its box. Fig. 2, is a similar view showing liquid in the jar, and Fig. 3, is a side view with parts broken away of the finished battery.

Referring to Fig. 1, 1, is the wall of a hard rubber jar, and 2, is the wall of the box or container. There is shown, more or less diagrammatically, at 3, the condition that arises by reason of the fact that in practice perfect contact does not exist throughout between the adjacent faces of the jar and the box walls due to the necessities of manufacture and the nature of the materials. If a battery were mounted in the jar with the conditions as above described existing, the jar wall would not be supported at the part 3, and, being of hard rubber or hard rubber material, as it is sometimes called and therefore brittle, more especially when cold or cool, the jar wall will break for lack of sufficient support or sufficient continuity of support. According to the present invention the jar is put into its box and filled with hot water or other appropriate hot liquid, as indicated in Fig. 2 at 4. The result of this is that the jar wall is softened by the heat of the water and induced while soft by the weight of the water to yield sufficiently to come into perfect contact throughout its extent with the wall of the box, so that by this treatment the space shown at 3, in Fig. 2, would disappear and the jar wall will assume the position shown in Fig. 1, in which it is in close contact with the box wall and supported thereby throughout its extent. After the liquid 4, has produced the results above described, it is removed and the plate structure 5, and electrolyte 6, are put into the jar which, even though cold or cool and therefore brittle, will not break because it is supported throughout its entire surface by the box wall with which it is in continuous contact.

What I claim is:

1. The process of fitting hard rubber jars to their boxes which consists in assembling the hard rubber jars and boxes in nested relation with the jars full of warm liquid which softens the hard rubber jar walls and forces them, while soft, into intimate contact with all points of the box walls which thereafter support them, substantially as described.

2. The process of fitting hard rubber jars to their boxes which consists in assembling the hard rubber jars and boxes in nested relation with the jars full of warm liquid which softens the hard rubber jar walls and forces them, while soft, into intimate contact with all points of the box walls which thereafter support them, removing the water, and mounting the electrolyte and plate structure in the jar, substantially as described.

CARROLL HODGE.

Witnesses:
  BRUCE FORD,
  L. H. FLANDERS.